(No Model.)

W. B. SPENCER.
VALVE FOR PIPING.

No. 555,588. Patented Mar. 3, 1896.

Witnesses
Harry L. Amer.

Inventor
William B. Spencer.
By his Attorneys,
C. A. Snow & Co.

UNITED STATES PATENT OFFICE.

WILLIAM B. SPENCER, OF CHICAGO, ILLINOIS.

VALVE FOR PIPING.

SPECIFICATION forming part of Letters Patent No. 555,588, dated March 3, 1896.

Application filed January 17, 1895. Serial No. 535,265. (No model.)

*To all whom it may concern:*

Be it known that I, WILLIAM B. SPENCER, a citizen of the United States, residing at Chicago, in the county of Cook and State of Illinois, have invented a new and useful Valve for Piping, of which the following is specification.

This invention relates to valves for piping; and it has for its object to provide certain improvements in valves that are designed for service in any kind of pipes or tubes, but particularly in connection with the pipes or tubes of bulb-syringes that are employed for surgical purposes.

To this end the main and primary object of the present invention is to provide valves of the character noted that shall be simple in construction, easily applied, and durable, while at the same time providing simple and efficient pipe-joints where the valves are usually located, and will not become clogged or otherwise affected by the passage through the piping or tubes of solid, semisolid, tenacious or linty substances and the like.

With these and other objects in view, which will readily appear as the nature of the invention is better understood, the same consists in the novel construction, combination, and arrangement of parts hereinafter more fully described, illustrated, and claimed.

Figure 1:
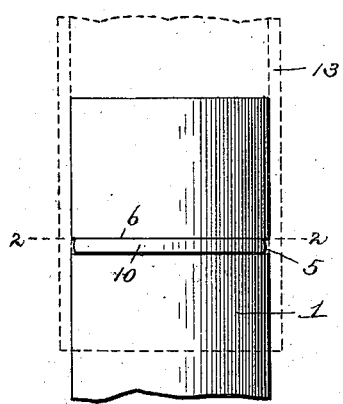
Figure 3:
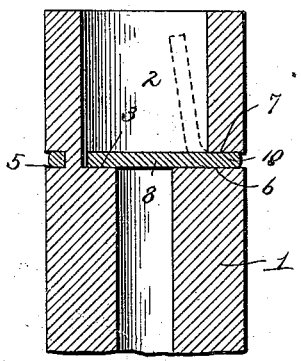
Figure 5:
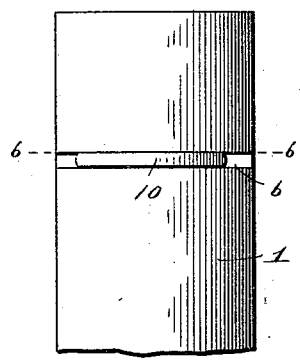
Figure 2:
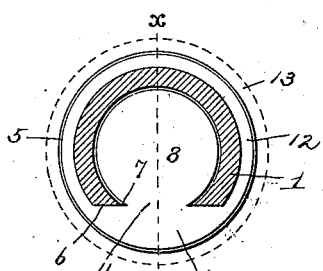
Figure 4:
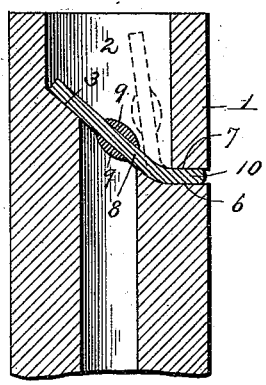
Figure 6:
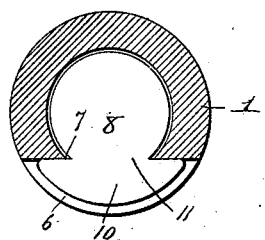
Figure 7:
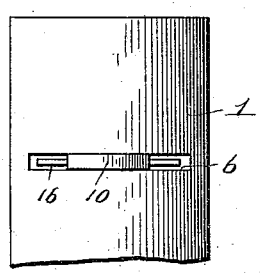
Figure 8:
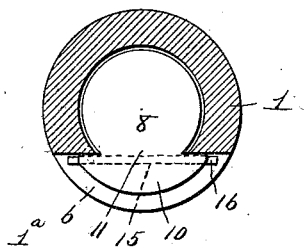
Figure 9:
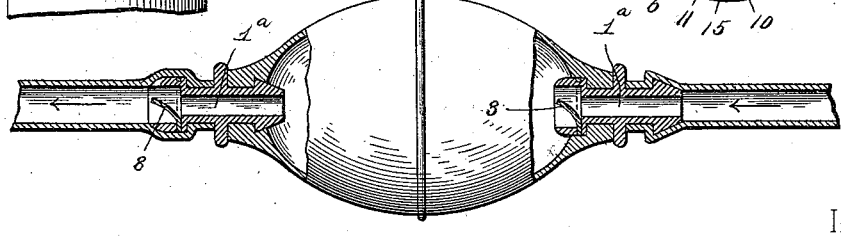

In the drawings, Figure 1 is a side elevation of a pipe-section provided with a valve attachment constructed in accordance with this invention. Fig. 2 is a transverse sectional view on the line 2 2 of Fig. 1. Fig. 3 is a sectional view on the line $x$ $x$ of Fig. 2. Fig. 4 is a view similar to Fig. 3, showing a modified arrangement of the valve. Fig. 5 is a side elevation of a pipe-section provided with a modified form of the valve attachment. Fig. 6 is a transverse sectional view on the line 6 6 of Fig. 5. Figs. 7 and 8 are detail views similar to Figs. 5 and 6, showing another modified form of valve attachment. Fig. 9 is a detail sectional view showing a valve attachment arranged in connection with a nipple connection of a bulb-syringe at the joint between the bulb and the pipes or tubes.

Referring to the accompanying drawings, 1 designates an ordinary pipe-section, and said pipe-section 1 may be either a plain cylindrical section, as illustrated in Fig. 1, or may consist of a nipple $1^a$, (illustrated in Fig. 9 of the drawings,) and which nipple is of a construction commonly employed as a connection or joint between the bulb and pipes or tubes of a bulb-syringe.

The pipe-section 1 is interiorly enlarged at one end, as at 2, to form a valve-seat shoulder 3, which may be either disposed at right angles to the length of the pipe-section, as illustrated in Fig. 3, or which may be disposed at an incline or obliquely, as illustrated in Fig. 4 of the drawings, and the said pipe-section 1 is further provided at the interiorly-enlarged end thereof with an exterior annular fastening-groove 5, that is deepened at one side of the pipe-section to form an enlarged key-seat 6, into which leads the side pipe-opening 7, formed in one side of the pipe-section 1 in a line with and at one side of the valve-seat shoulder 3.

The interiorly-enlarged end 2 of the pipe-section 1 forms a valve-chamber to accommodate for movement therein the flexible valve-disk 8, that is adapted to work over and onto the valve-seat shoulder 3 to provide for automatically opening and closing the passage through the pipe-section as the syringe is in use and is intended particularly to prevent the backflow of liquids that pass through the pipe. The flexible valve-disk 8 is made out of any suitable sheet material, such as soft sheet-rubber, and when hard service requires it, such as in pump service and the like, the valve may be stiffened or strengthened by securing on both sides thereof aluminum or other similar light metal stiffening-plates 9, which are illustrated only in Fig. 4 of the drawings.

The flexible valve-disk 8 is formed integrally with a semielliptical fastening-key portion 10, that is stamped out of the same sheet of material together with the valve-disk itself, and said semielliptical fastening-key 10 joins with one side of the valve-disk in a reduced neck 11, that fits in the side opening 7 of the pipe-section 1, and this neck portion 11 forms the hinge connection of the valve with one side of the pipe-section, so that the valve can freely work up and down over its seat. The semielliptical fastening-key 10 of the valve-disk registers in the enlarged key-seat 6, formed exteriorly in one side of the pipe-section, and continued integrally from the opposite extremities or ends of the semielliptical key 10 is a fastening-ring portion 12, that is made from the same sheet of material as the disk 8 and the key 10 and disposed concentric to the valve-disk 8, so as to snugly fit in the exterior annular groove 5 of the pipe-section, thereby completing, together with the key portion 10, simple and efficient means for positively fastening the valve in position within the pipe-section.

By reason of the disposition of the fastening-key 10 and the ring 12 within an exterior groove of the pipe-section 1 no projecting portions are left that would interfere with the fitting of another pipe-section, 13, over the pipe-section 1 to complete an ordinary pipe-joint, as illustrated in Fig. 1.

At this point it is to be observed that the shoulders formed at opposite ends of the semi-elliptical fastening-key 10 engage against the pipe 1 at opposite sides of the opening 7 therein, and thereby positively position the valve 8 in place within the pipe and prevent the valve from being displaced in either its opening or closing movements.

The fastening means for the valve are susceptible of slight modifications, such as illustrated in Figs. 5 and 6 of the drawings. In these figures of the drawings the exterior annular fastening-groove is omitted, or at least is not continued around the pipe-section, and such pipe-section is therefore only provided with the groove forming the enlarged key-seat 6, in which fits the semielliptical fastening-key 10, and in this form of the valve attachment the key 10 is not provided with a concentric-ring extension 12, as illustrated in the other figures of the drawings.

Another modification similar to the modification illustrated in Figs. 5 and 6 of the drawings is illustrated in Figs. 7 and 8 of the drawings. In these figures of the drawings the pipe-section is simply provided at one side with the enlarged key-seat 6, and the flexible valve-disk 8 is provided with the semielliptical fastening-key 10, which fits in the said enlarged key-seat. In this modification, however, the semielliptical fastening-key portion of the valve-disk is provided with a pin-opening 15, that receives therein a supplemental fastening-pin 16, the ends of which project beyond the opposite ends of the key portion 10 and lie within the seat 6, to provide not only for additionally securing the valve-disk in position, but also for bracing or strengthening the same at the point where it hinges and requires bracing or strengthening the most.

From the above it is thought that the construction and operation of the herein-described valve attachment for both ordinary and syringe piping will be readily understood by those skilled in the art, and although the attachment is illustrated as applied to plain and nipple pipe-sections it will of course be understood that the same can be used in connection with any kind of piping or tubing, and any changes in the form, proportion, and the minor details of construction may be resorted to without departing from the principle or sacrificing any of the advantages of this invention.

Having thus described the invention, what is claimed, and desired to be secured by Letters Patent, is—

1. In a valve attachment of the class described, a pipe-section provided with an interior valve-seat, an enlarged exterior key seat or recess, and a side opening leading into the key seat or recess from one side of the interior valve-seat, and a flexible valve-disk arranged within the pipe-section over the valve-seat and provided at one side with an integral semielliptical fastening-key portion lying entirely within said exterior key seat or recess, the shoulders formed at opposite ends of the key portion engaging against the pipe-section at opposite sides of the side opening therein, substantially as set forth.

2. In a valve attachment of the class described, a pipe-section provided with an interior valve-seat, an exterior annular groove deepened at one side to form a key seat or recess, and a side opening leading into the key seat or recess at one side of the interior valve-seat, and a flexible valve-disk arranged within the pipe-section and provided at one side with an integral semielliptical fastening-key portion fitting in said exterior key seat or recess, and a concentric fastening-ring portion continued integrally from the ends of the key portion and fitting in said annular groove, substantially as set forth.

In testimony that I claim the foregoing as my own I have hereto affixed my signature in the presence of two witnesses.

WM. B. SPENCER.

Witnesses:
E. M. DYER,
ASA A. BURNHAM.